Dec. 28, 1948. D. G. ROOS 2,457,400
AUTOMOTIVE VEHICLE
Filed Dec. 2, 1944 7 Sheets-Sheet 1
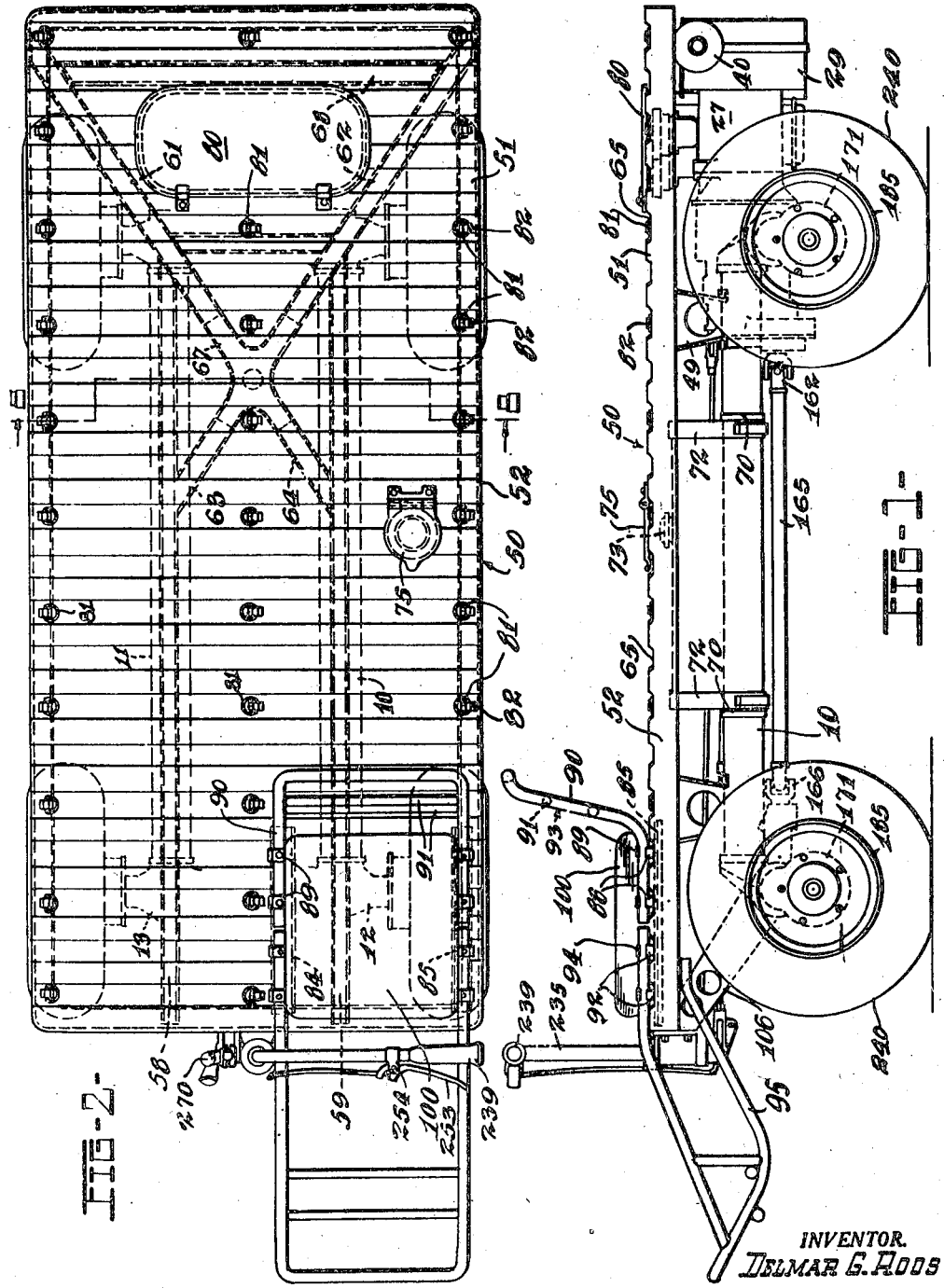
INVENTOR.
DELMAR G. ROOS
BY Harry O. Ernsberger
ATTORNEY.

Dec. 28, 1948.  D. G. ROOS  2,457,400
AUTOMOTIVE VEHICLE
Filed Dec. 2, 1944  7 Sheets-Sheet 2
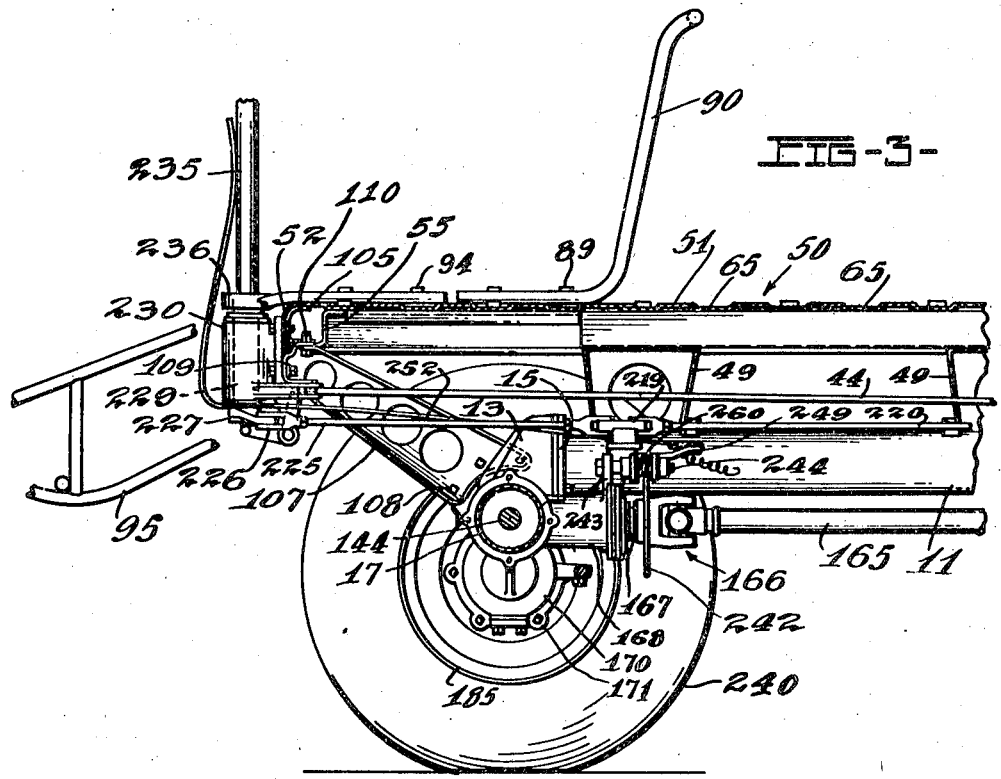
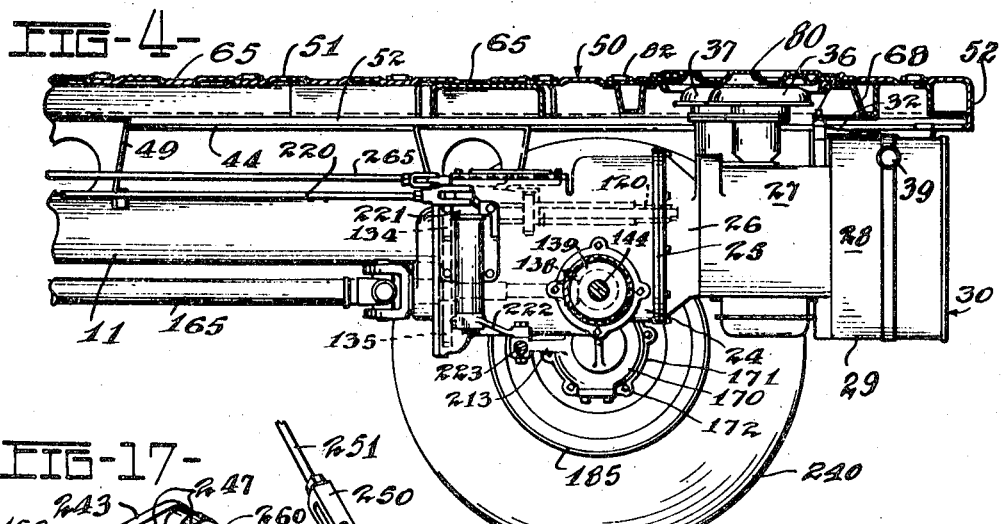
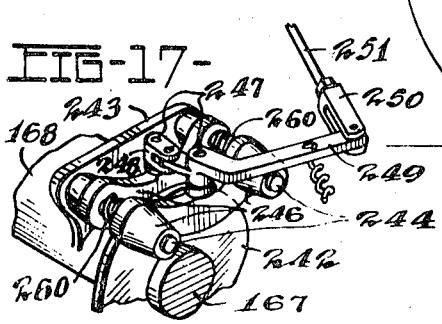
INVENTOR.
DELMAR G. ROOS
BY Harry O. Ernsberger
ATTORNEY.

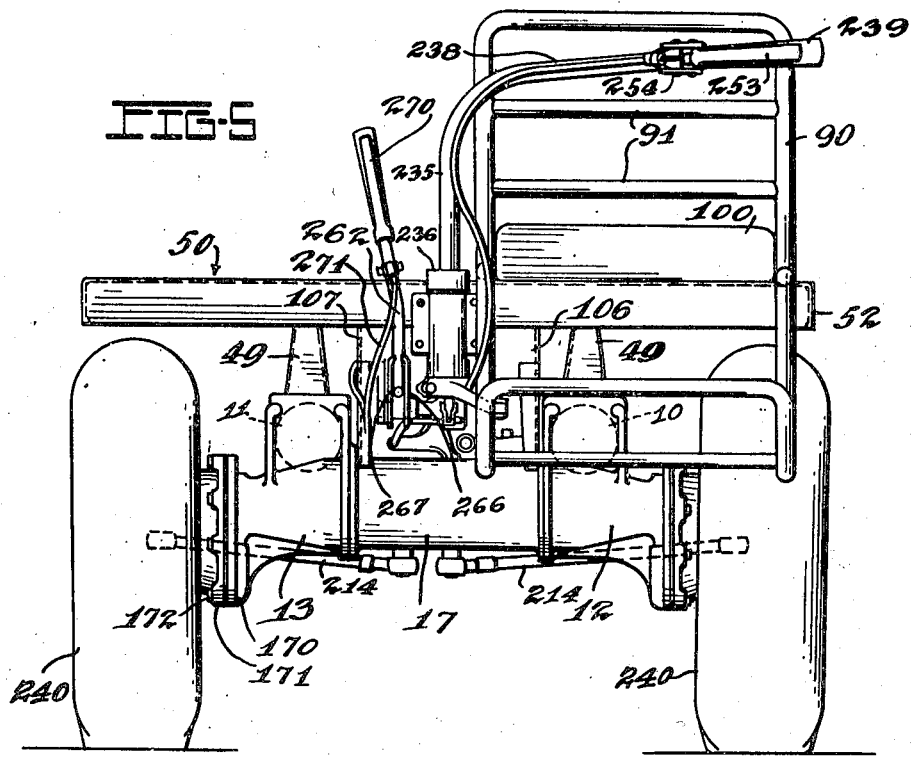

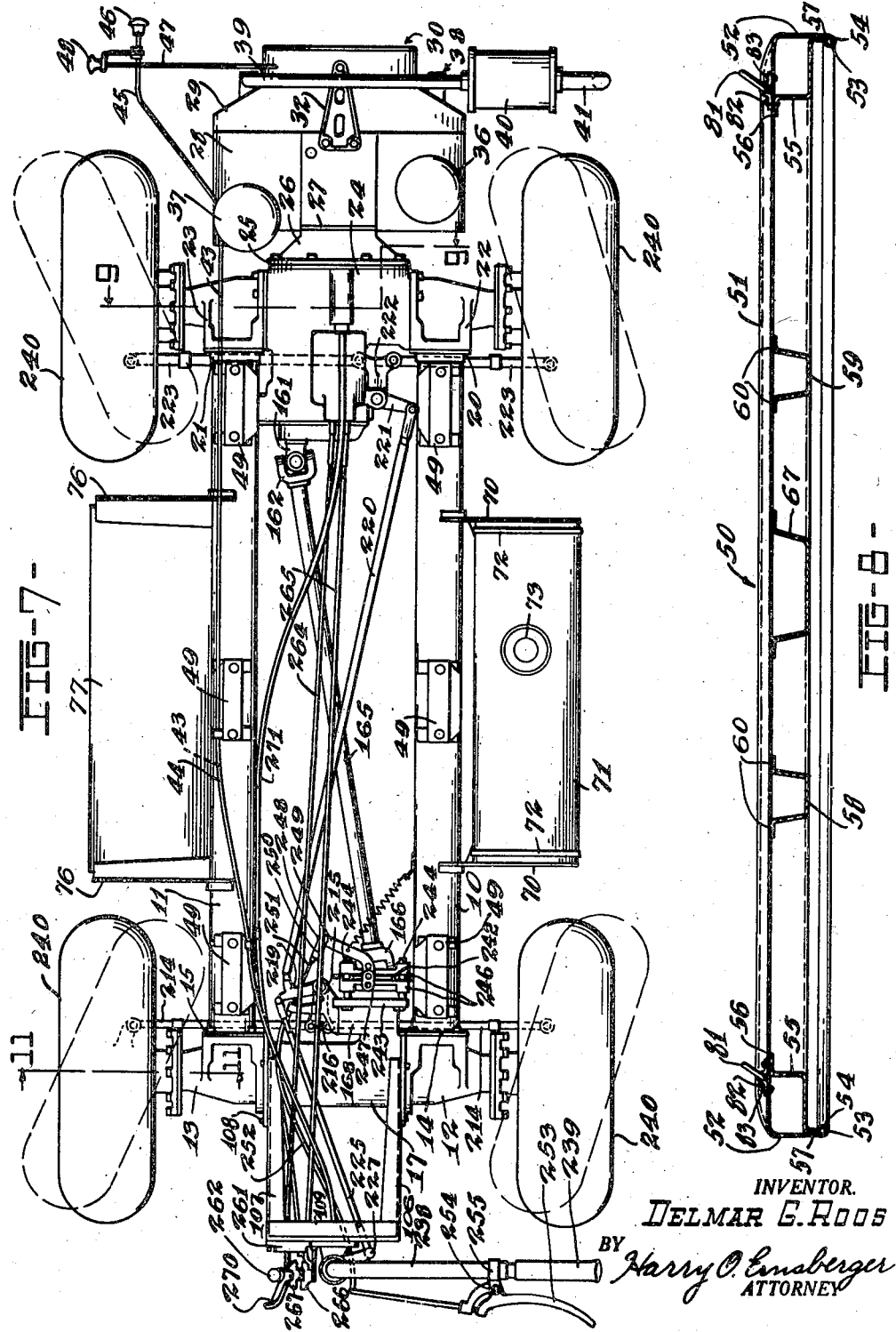

Dec. 28, 1948. D. G. ROOS 2,457,400
AUTOMOTIVE VEHICLE
Filed Dec. 2, 1944 7 Sheets-Sheet 5
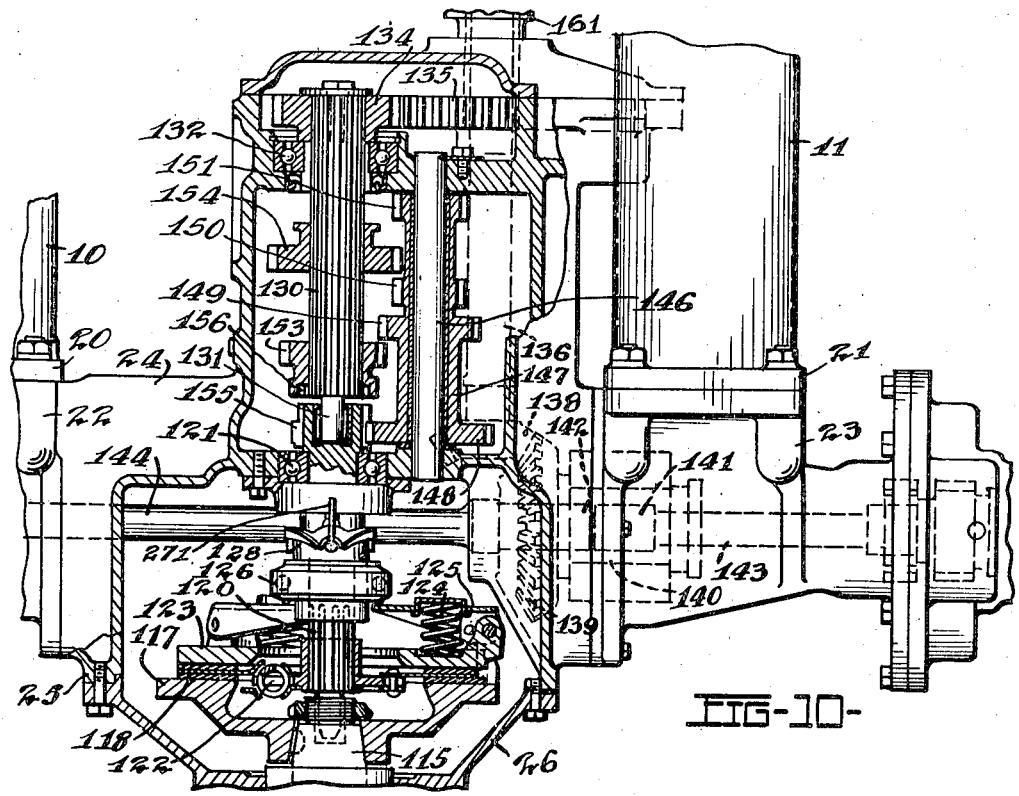
FIG-10-
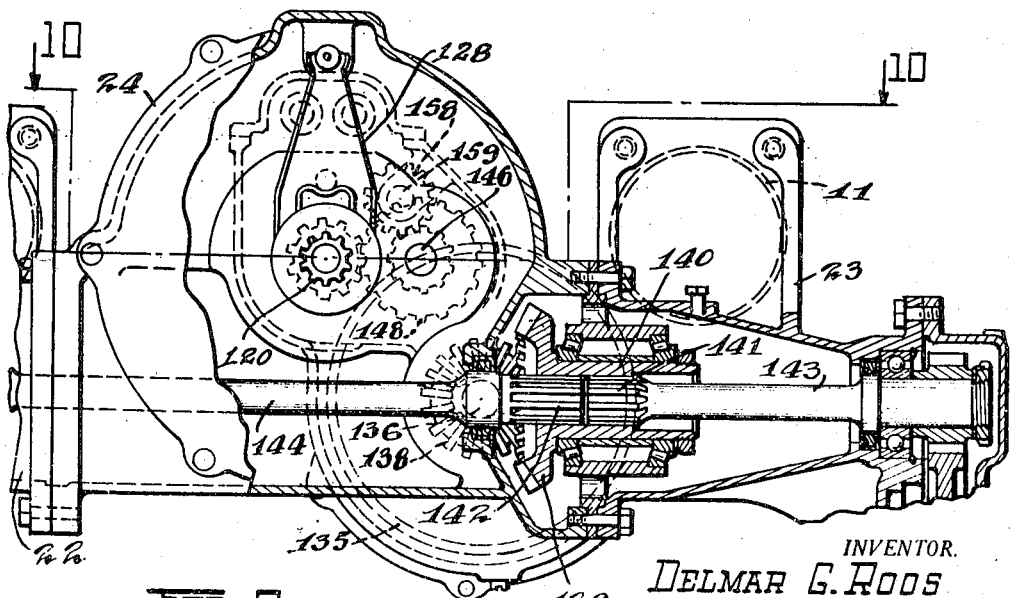
FIG-9-
INVENTOR.
DELMAR G. ROOS
BY
Harry O. Ernsberger
ATTORNEY

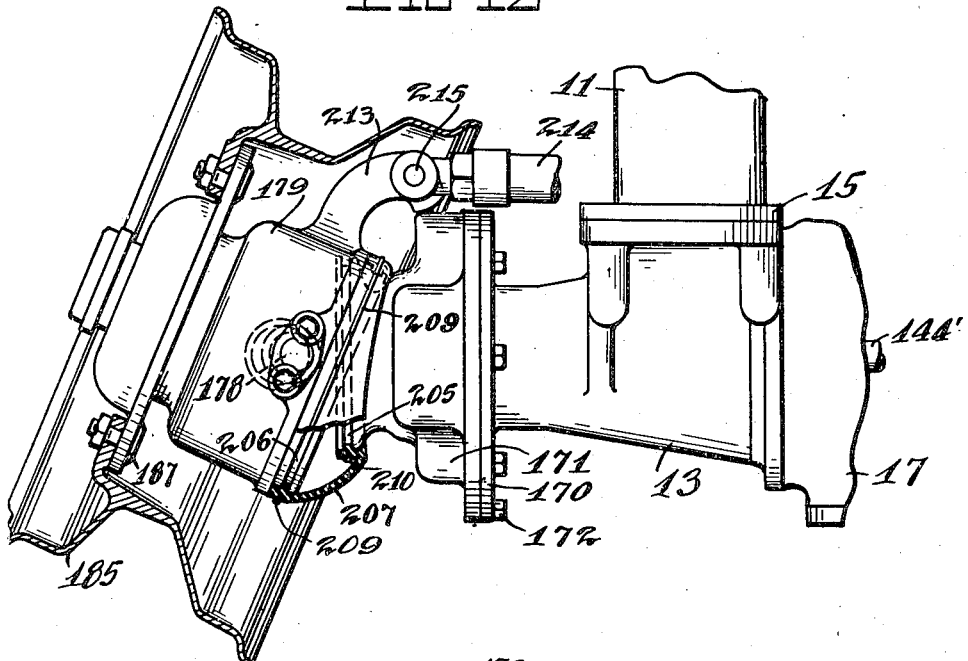
FIG-12-
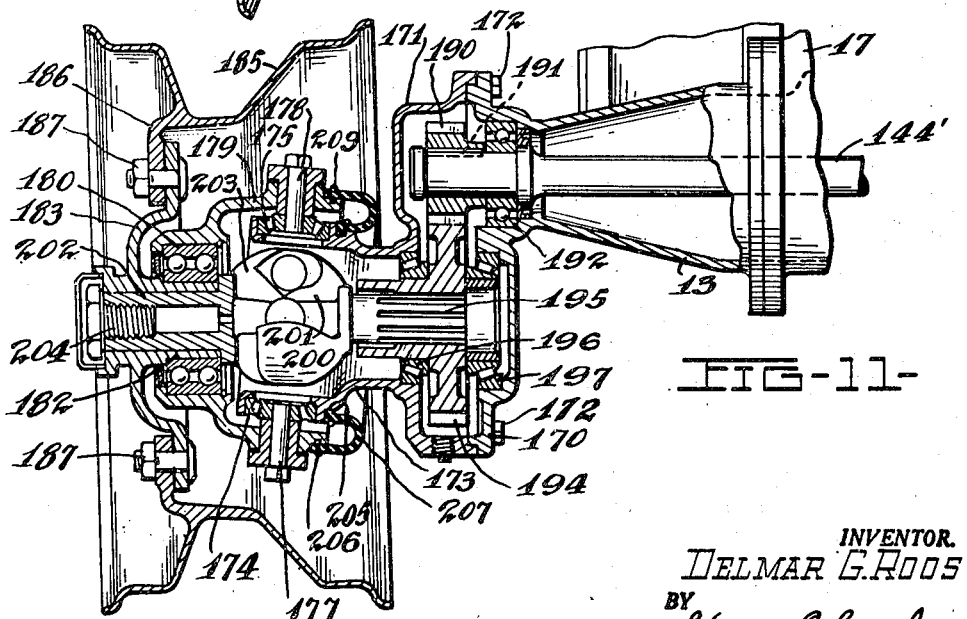
FIG-11-
INVENTOR.
DELMAR G. ROOS
BY Harry O. Ernsberger
ATTORNEY.

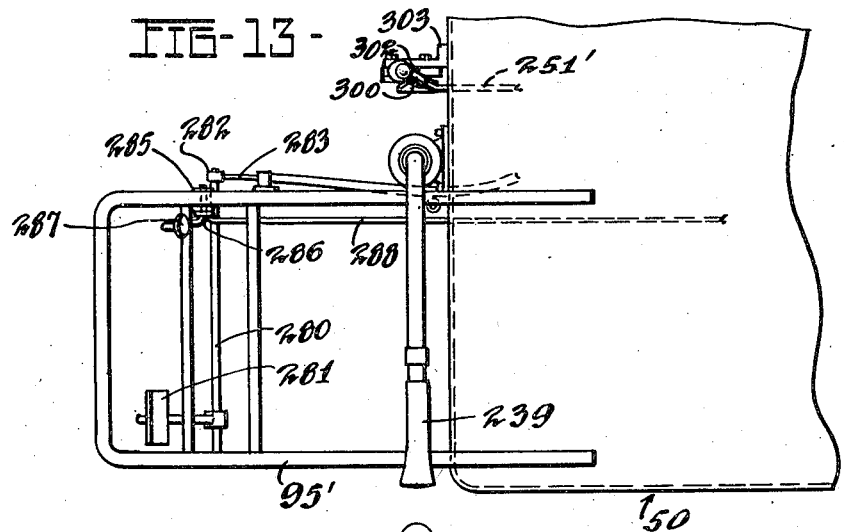
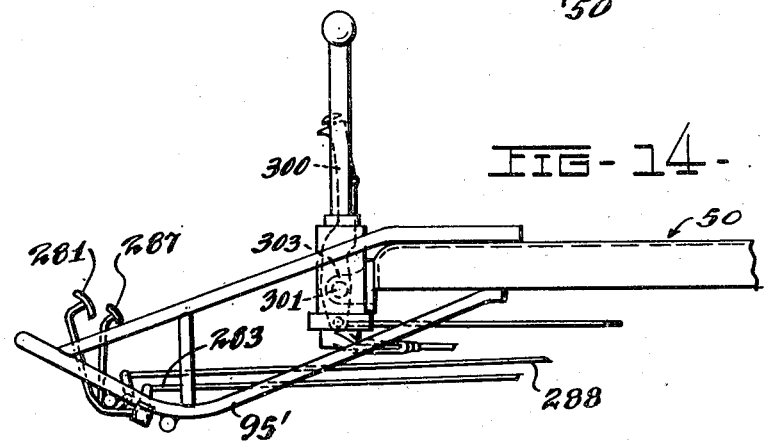
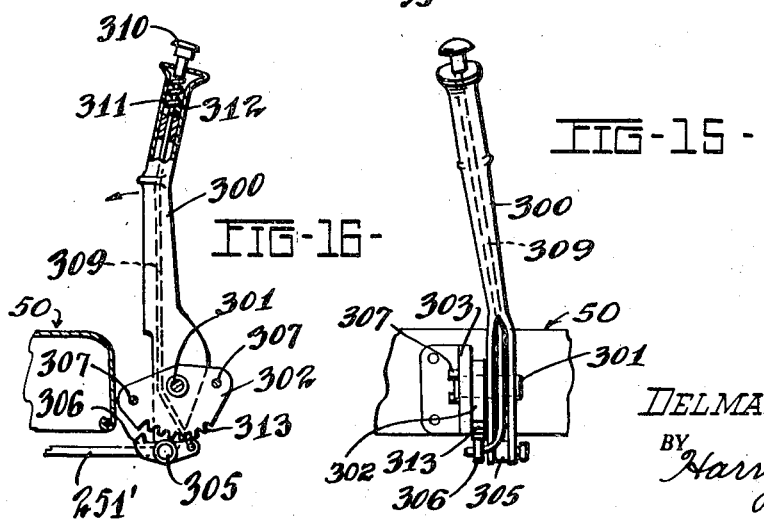

Patented Dec. 28, 1948

2,457,400

UNITED STATES PATENT OFFICE 2,457,400

AUTOMOTIVE VEHICLE

Delmar G. Roos, Toledo, Ohio, assignor to Willys-Overland Motors, Inc., Toledo, Ohio, a corporation of Delaware Application December 2, 1944, Serial No. 566,309

8 Claims. (Cl. 180—48)

This invention relates to automotive vehicles and more especially to a light weight self-propelled vehicle particularly adaptable for many and various uses.

The invention embraces an automotive vehicle having an extremely low silhouette which is provided with a body construction particularly arranged to transport supplies or cargo over rough or unusual terrain.

The invention comprehends a vehicle wherein the body construction is supported directly upon the vehicle running gear without the interposition of springs.

An object of the invention is the provision of light weight vehicle in which the engine or prime mover is disposed beneath the body and wheren the four wheels of the vehicle are driven from the engine.

Another object of the invention is the provision of a simple and compact four wheel drive arrangement wherein pneumatic tires of the low pressure type provide the means for absorbing the shock of road irregularities.

Another object of the invention resides in a novel steering arrangement and control whereby steering may be effected through all four wheels.

Another object of the invention is the provision of a self-propelled vehicle of light weight yet of sufficient strength and rigidity to transport a load of greater weight than that of the vehicle per se, the vehicle being of a character which may be readily transported in aircraft and capable of being plummeted or parachuted to the ground from aircraft in flight.

Still another object is the provision of a vehicle of light weight provided with a body construction having a substantially uniplanar load supporting surface for ready adaptation in carrying supplies, cargo or passengers.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred in which:

Figure 1 is a side elevational view illustrating a form of vehicle of my invention;

Figure 2 is a top plan view of the vehicle shown in Figure 1;

Figure 3 is a vertical longitudinal sectional view through the forward portion of the vehicle;

Figure 4 is a vertical longitudinal sectional view through the rear portion of the vehicle;

Figure 5 is a front elevational view of the vehicle;

Figure 6 is a rear elevational view of the vehicle;

Figure 7 is a top plan view of the vehicle with the body or platform removed;

Figure 8 is a transverse detail sectional view through the body, the section being taken substantially on the line 8—8 of Figure 2;

Figure 9 is a detail sectional view taken substantially on the line 9—9 of Figure 7;

Figure 10 is a sectional view through the transmission gearing, the section being taken substantially on the line 10—10 of Figure 9;

Figure 11 is a vertical detail sectional view through one of the front wheels, the section being taken substantially on the line 11—11 of Figure 7;

Figure 12 is a top plan view of the wheel supporting means illustrated in Figure 11, the wheel being shown in section;

Figure 13 is a top plan view of the forward portion of the vehicle illustrating a modified arrangement of vehicle controls;

Figure 14 is a side elevational view of the construction shown in Figure 13;

Figure 15 is a front elevational view of a brake operating construction as embodied in the construction shown in Figure 13;

Figure 16 is a side elevational view of the brake operating mechanism shown in Figure 15;

Figure 17 is an isometric view illustrating an arrangement of brake mechanism incorporated in the vehicle.

While I have illustrated the vehicle of my invention as especially adapted for transporting cargo having particular adaptability for military use, I contemplate its utilization for transporting or carrying passengers or for any other uses for which it may be found to be suitable.

Referring to the drawings in detail, the construction is inclusive of a frame or sub structure formed of parallel tubular members 10 and 11 which are respectively connected at their forward extremities to members or housings 12 and 13 through the medium of flanges 14 and 15, the latter being welded to the ends of the tubes 10 and 11 and bolted to housings 12 and 13. The housings 12 and 13 are secured to the extremities of a transversely extending intermediate housing 17, the housings 12, 13 and 17 enclosing drive gearing hereinafter to be described. Welded or otherwise secured to the rear ends of the tubes 10 and 11 are flanges 20 and 21 for connecting or securing the tubes to housings 22 and 23, the same being generally of the same configuration as housings 12 and 13. Positioned intermediate housings 22 and 23 and secured thereto, is another housing 24 which is adapted to enclose power transmission change speed gearing (to be hereinafter described) as well as mechanism for driving the rear wheels of the vehicle. The transmission housing 24 is formed with a flange 25 to which is bolted a clutch housing or enclosure 26 to which is secured the crankcase 27 of a prime mover or engine 28.

The engine or prime mover 28 illustrated is the twin cylinder air cooled type in which the cylinders are arranged in horizontal opposed relation and which extend laterally from the crank case 27. The engine is substantially enclosed in a sheet metal shroud 29, the latter being formed at its rear portion with an annular opening 30 through which air may pass through the shroud, a protective mesh or grill work 31 being disposed adjacent the openings. Positioned adjacent the opening 30 and within the shroud 29 is a fan (not shown) driven by the engine for circulating air through the shroud and around the engine cylinders to cool the latter. The crank case 27 of the engine is bolted to the clutch housing 26, and in addition added support for the engine and shroud is provided by a bracket 32 which is secured to the body or platform construction of the vehicle.

The engine cylinders are provided with individual carburetors 34 and 35, each carburetor being provided with an air filter or cleaner 36 and 37. The exhaust system for the engine is inclusive of exhaust pipes or ducts 38 and 39 which are joined together and convey exhaust gases from the engine to a muffler or silencer 40, the latter being provided with an outlet 41 open to the atmosphere.

A throttle control cable 43 is connected to the valve mechanism of the carburetors 34 and 35 to regulate or control the fuel mixture supplied to the engine, the cable being contained within a flexible sheath 44 which terminates adjacent the forward portion of the vehicle and is operatively connected to means for actuating the same which will be hereinafter described. The carburetors are provided with choke valves or means for enrichening the fuel mixture during engine starting operations, this means being controlled by a rod 45 extending rearwardly of the vehicle and having a knob 46 affixed to the extremity thereof for manipulation during starting operations. A manual starting means is incorporated with the engine flywheel (not shown) which is actuated by means of a flexible cable 47 at the extremity of which is a manipulating handle 48 disposed adjacent a rear corner of the vehicle.

Welded to the tubular frame members 10 and 11 are upwardly extending brackets 49 upon which is mounted a body or load support 50. The body construction illustrated is of a character particularly adapted to carry or transport cargo and is inclusive of a sheet metal platform 51 generally of a uniplanar construction, the upper surface, however, being formed with a plurality of transversely extending spaced shallow recesses 65 for purposes hereinafter explained. The platform 51 is of rectangular configuration bounded by a flange portion 52 integrally formed with the platform which depends therefrom, the depending extremity of flange 52 being configurated as at 53 to embrace a reinforcing wire or bar 54. Peripherally arranged beneath the platform is a reinforcing strip or member 55 having projecting flange portions 56 and 57 which are welded respectively to the uniplanar portion of the platform 51 and the depending flange portion 52 thereof.

The platform or body is reinforced by means of U-shaped channel members 58 and 59 extending longitudinally of the platform, and being welded thereto as at 60 shown in Figure 8. The platform construction, adjacent the engine, is reinforced by means of U-shaped channels or members 61 and 62, 63 and 64 which are welded to the platform 50 and are joined together by means of a fitting 67 welded to the adjacent extremities of the diagonally arranged channels and to the platform 50. The rear portion of the platform is reinforced by means of a transversely extending U-shaped channel 68 as shown in Figure 4. Welded to the tube 10 and extending laterally therefrom are brackets 70 providing a supporting means for a fuel supply or gasoline tank 71, the latter being secured to the brackets 70 by means of metal straps 72. The fuel supply tank 71 is provided with a filler cap 73 which is positioned beneath a circular opening formed in the platform 50. A cover 75 is hingedly supported upon the platform and normally covers or encloses the opening in the platform. By this arrangement ready access to the fuel tank may be had by opening the cover 75 and removing filler cap 73 in order to introduce fuel into the tank 71.

Welded to the frame tube 11 and extending laterally therefrom is a pair of brackets 76 which support a tool box or receptacle 77. The rear portion of the body or platform 50 is formed with a substantially rectangular opening which is normally closed by means of a hinged cover 80 which may be swung to open position for access to the engine.

Means are provided for securing cargo or load to the body which is inclusive of a plurality or series of rings or loops 81 which are disposed within the recesses 65 formed in the upper surface of the platform 51. Each of the rings 81 is secured in a recess by means of a clip 82 secured to the platform by means of rivets 83. It should be noted from Figure 8 that the rings 81 are capable of swiveling movement about the mid portions of their respective securing or retaining clips 82. By this means, when the cargo is removed from the body or platform each of the rings 81 may be pivotally swung into parallelism with the upper surface of the recess within which it is positioned, and thereby eliminate projections extending upwardly from the upper surface plane formed by the ridges or embossed portions 56. The rings 81 provide a means to receive straps or cables (not shown) for lashing or securing cargo to the platform.

Adjacent the forward left hand portion of the platform 50 there is provided longitudinally extending channel-shaped members 84 and 85 welded to the lower surface of the platform. Welded to the channel members 84 and 85 are threaded elements 88 which are adapted to receive bolts 89 for securing a tubular seat back frame 90 to the body. The tubular frame 90 is provided with transverse bars 91 forming the support for a cushioned seat back (not shown). Threaded elements 92 also welded to channel members 84 and 85 are adapted to receive bolts 94 for securing a tubular frame 95 forming a foot rest for the vehicle operator. By means of this construction, the bolts 89 and 94 may be removed so that the seat back and foot rest assemblies may be readily and quickly disassembled from the vehicle for purposes of shipping so that the vehicles may be stored or packed one upon another in a minimum of space. A seat pad 100 is adapted to be supported by the platform 50 immediately ahead of the seat back 90. The seat pad is provided with projections which extend into clips (not shown) to hold the seat pad in place.

The forward extremity of the body or platform 47 is reinforced by means of a strap or bar 105 which is welded to the depending flange 52 and to the reinforcement member 55 as particularly shown in Figure 3. The housing 17 is secured to the body construction by means of brackets 106 and 107 which are secured to a flange formed on the housing by means of bolts 108. The forward portions of brackets 106 and 107 are welded or otherwise secured to a transversely extending strip 109 the latter being secured to the reinforcing members 55 and 105 by means of bolts 110.

The engine is arranged to transmit power for driving all four wheels of the vehicle through change speed gearing or transmission mechanism for obtaining several forward speed ratios and reverse. Keyed to the extremity of engine shaft 115 is a member 117 which forms a driving element of a clutch mechanism. A driven shaft 120, journalled at its forward end in a bore in the extremity of shaft 115 and at its rearward portion upon anti-friction bearings 121, is splined to receive a driven member 122 forming a part of the clutch mechanism. The member 117 supports a pressure plate 123 which is actuated by means of springs 124 cooperating with levers 125, the latter being in cooperative engagement with a clutch throwout bearing 126. The clutch may be engaged or disengaged by movement of the clutch throwout bearing through the medium of a lever 128 connected by cable 271 to a clutch actuating means hereinafter described.

The shaft 120 is in alignment with a splined shaft 13 the latter having a tenon portion 131 journalled for rotation on needle bearings carried in a cylindrical recess formed in the end of shaft 120 the other end of shaft 130 being journalled in ball bearings 132 supported within the housing 24. Fixedly secured upon the end of shaft 130 is a spur gear 134 which is in constant mesh with a driven gear 135 which is fixedly secured upon a shaft 136 also journalled in the housing 24. Fixed at one end of shaft 136 is a mitre gear 138 which is in mesh with a mitre gear 139, the latter being formed with a hub portion 140. The hub 140 has a central splined opening to receive the splined ends 141 and 142 of driven shafts 143 and 144.

Disposed within the transmission housing 24 is a countershaft 146 upon which is journaled a sleeve 147 upon which is integrally formed toothed gears 148, 149, 150 and 151. Splined for slidable movement on shaft 130 are gears 153 and 154. Shaft 120 is formed at one end with a gear 155 which is in constant mesh with gear 148, so that the sleeve 147 is at all times driven by and through shaft 120 whenever the latter is connected with the engine through the clutch mechanism. Low gear is obtained by sliding gear 154 into mesh with gear 150; second or intermediate gear is obtained by sliding gear 153 into mesh with gear 149 and high gear being obtained by meshing the teeth or dogs 156 on gear 153 with teeth formed on shaft 120 adjacent gear 155. A reverse gear 158 is provided journaled upon a stub shaft 159, gear 158 being in mesh with gear 151 thus constantly rotating the reverse gear 158. When it is desired to obtain reverse direction of drive, gear 154 is moved toward the front of the vehicle as viewed in Figure 10 until the teeth thereof mesh with the teeth of the reverse gear 158.

The portion of shaft 136 extending from the housing 24 is provided with a yoke or member 161 forming a part of a universal joint assembly 162. The universal joint 162 is connected by means of a propeller shaft 165 to a second universal joint 166, the latter being connected to a shaft 167 which is journaled in an extension 168 formed integrally with the housing 17. The shaft 167 is provided with a mitre gear of the same size and configuration as mitre gear 138 and conveys power to the front wheels of the vehicle in the same manner as mitre gear 138 (shown in Figure 9) conveys power to the rear wheels of the vehicle.

As the drive arrangement for each wheel and the method of support for the wheels are identical, it will suffice herein to describe one wheel, its supporting means and drive mechanism therefor as particularly shown in Figures 11 and 12. Housing 13 terminates in an enlarged flanged portion 170 to which is secured a housing 171 by means of a plurality of bolts 172. Housing 171 has an integral lateral extension 173, the upper and lower portions of which are configurated to receive anti-friction bearings 174 and 175, the bearings illustrated being of the tapered roller type. The inner races of the bearings 174 and 175 are respectively connected to stub shafts 177 and 178 which are carried in a member 179. Member 179 houses an anti-friction bearing 180 preferably of the double row ball type upon which is revolubly mounted the hub 182 of a wheel supporting member 183. The vehicle wheel 185 is provided with an inwardly extending flange 186 which is secured to the wheel supporting member 183 by means of a plurality of bolts 187. The stub shafts 177 and 178, in effect, form a king pin about which the wheel 185 may swivel or is rendered dirigible for steering purposes. Each of the four wheels of the vehicle are mounted in the manner above described.

The shaft 144' which is of the same construction as shaft 144 (see Figure 9) carries at its outer end a spur gear 190 secured to the shaft by means of a key 191. A ball bearing 192 is disposed within housing 13 and supports shaft 144'. Gear 190 is in mesh with a larger spur gear 194 which is splined upon a shaft 195, the latter being journaled for rotation in tapered roller bearings 196 and 197 mounted respectively in housing 171 and the enlarged portion 170 of housing 13. The outer end of shaft 195 is provided with an element 200 of a universal joint construction 201 preferably of the so-called constant velocity type. The hub portion 182 of the wheel support 183 is bored to snugly receive a member 202, the inner end of which is configurated as at 203 to form an element of the universal joint 201. The member 202 is fixedly secured to the hub 182 by means of a retaining bolt 204. The lateral extension 173 and member 179 are formed with annular grooves 205 and 206 to receive a flexible boot or closure 207 for the purposes of keeping dust and foreign matter out of the universal joint chamber and preventing the leakage of lubricant from the chamber. The closure 207 is held in position by means of snap rings 209 and 210 as particularly shown in Figure 12. It will thus be apparent that the shaft 144' rotates gear 190, and the latter being in mesh with gear 194, causes rotation of the universal joint 201, wheel support 183 and wheel 185. During steering or dirigible movements of the wheels, the universal joint units 201 provide for the transmission of power to the wheels to drive the same.

In the embodiment of my invention illustrated, the steering of the vehicle is accomplished by coordinated movement of all four wheels. As shown in Figure 12, each of the members 179 is formed with a projecting arm 213 to which is connected a tie rod 214 by means of a pin 215. Each of the tie rods 214 arranged adjacent the front wheels of the vehicle are connected to one arm of a bell crank 216 as shown in Figure 7, the bell crank being pivotally supported as at 215 upon a projection formed on the housing 168. The other arm 219 of the bell crank is connected by means of a rod 220 to one arm of a second bell crank 221 which is pivotally supported upon the housing 24. The other arm 222 of the bell crank 221 is connected to the inner ends of a second set of tie rods 223 which are of the same construction as tie rods 214. The arm 219 of member 217 is also connected by means of a rod 225 and clevis 226 to an arm 227 carried upon the lower end of a vertically disposed shaft 229 journaled in a bracket 230 secured to the forward portion of the platform or body 50. A steering member or arm 235 forms a continuation of shaft 229 being connected thereto by means of a releasable coupling (not shown) the coupling being manipulated by slidable movement of a collar 236. The steering member 235 has a laterally extending portion 238 which is provided with an independently rotatable hand grip portion 239. The steering arm 238 is hollow for the purpose of accommodating a throttle connection 44 which extends upwardly through the arm 238 and is operatively connected to the rotatable hand grip 239. Thus the handle 239 operates as a throttle control for the engine through the rotational movement of the grip, and as a means for steering the vehicle by swinging the arm 238 about the axis of shaft 229, the swinging movement causing corresponding movement of rods 220 and 225, tie rods 214 and 223, and hence a swivelling of the four vehicle wheels about the axes of sets of pins 177 and 178 to control the direction of movement of the vehicle.

Braking means are provided for the vehicle, this means being inclusive of a disc 242 which is fixed on the shaft 167 of the universal joint 166. The extension 168 of housing 17 is formed with a flanged portion 243 which carries a pair of stationary pins or stub shafts 244. Slidably mounted upon the shafts 244 is a pair of brackets 246 arranged one on each side of disc 242. Each of the brackets is provided with a pin 247, pins 247 being connected together by link 248 and a projection forming a part of arm 249. The arm 249 is connected by means of a clevis 250 and a cable 251, which is enclosed in a sheath 252, to an actuating handle 253 pivoted as at 254 upon a bracket 255 supported upon the steering arm 238. Thus relative movement of the actuating handle 253 toward the hand grip 239 swings the arm 249 to cause the brackets 246 to move toward each other and grip the peripheral portion of disc 242, thus apply a braking action through the shaft 167 and propeller shaft 165 through the driving mechanism to each of the wheels to stop the rotation of the vehicle wheels. Springs 260 are disposed between the brake shoes or brackets 246 to normally hold the shoes out of engagement with the disc 242.

Pivotally supported upon a bracket 261 carried at the forward portion of the vehicle is a lever 262 providing a means for shifting the slidable gears of the transmission mechanism contained within the housing 24. Rods 264 and 265 extend forwardly from the transmission housing 24 and are connected to shiftable members 266 and 267 which are pivotally supported upon a shaft carried by the bracket 261. By manipulating the lever 262 in a proper direction and in selective engagement with either of the members 266, 267, a series of different gear ratios may be obtained. Pivotally mounted upon lever 262 is a grip member 270 which is connected by a cable 271 with the clutch mechanism contained in the clutch housing 26 so as to disconnect the engine from the driven mechanism when the vehicle is at rest or during gear shifting operations.

In the modified form of mechanism controls for the vehicle as illustrated in Figures 13 through 16 inclusive, the foot rest frame 95' supports a transversely extending shaft 280 carrying a foot pedal 281 which is connected to the clutch mechanism contained within the housing 26 through the medium of an arm 282 and a cable 283. In this form of control, the clutch is manipulated by movement of the foot pedal 281. Welded to the one side frame member of foot rest 95' is a bracket 285 which is bored to receive a transversely extending shaft 286, the latter having an upwardly projecting portion terminating in a foot pedal 287 as shown in Figure 13. The pedal 287 is connected through the medium of a rod 288 to the throttle mechanism associated with the carburetors 34 and 35 disposed adjacent the engine cylinders, and thus provides a foot operated means or accelerator for regulating the quantity of fuel mixture supplied to the engine.

A modification of brake control means is provided in the form of a manually operated lever 300 pivoted as at 301 upon a bracket 302, the latter being secured to a member 303 carried by the forward portion of the body or platform 50 by means of bolts 307. The brake rod or cable 251' in this form of the invention is connected to the lower extremity of the lever 300 through the medium of a pin 305 which also serves as a pivotal connection for a locking or retaining pawl 306. The pawl 306 is connected to an actuating or pawl rod 309 which extends upwardly through the hollow central portion of the lever 300 and terminates exteriorly thereof in a manipulating knob or button 310. A coil spring 311 in the grip portion 312 of the lever normally urges the button 310 toward its outermost position and serves to resiliently retain the pawl 306 out of engagement with the serrations 313 formed on bracket 302 to permit unrestricted movement of the lever 300 in order to effect a setting of the brakes. Thus, the brakes may be set at any time by merely grasping the grip portion 312 and rotating the lever in a counter-clockwise direction about the pivot 301 as viewed in Figure 16. The lever mechanism is normally used as a service brake actuator. If it is desired to permanently set the brakes as when the vehicle is parked, it is only necessary to move the lever 300 to brake setting position and depress button 310 thus moving the pawl 306 into one of the serrations 313 to hold the lever 300 in brake setting position. To effect a release of the brake lever, a further slight counterclockwise movement thereof toward brake setting position releases the pressure between the pawl 306 and the serrations wall in engagement therewith so that the expansive force of spring 311 urges button 310 and rod 309 upwardly thus disengaging the pawl locking means from the bracket 302.

It will be apparent from the above description that I have produced a novel vehicle in which the four wheels are driven and are dirigible for steering purposes, thus enhancing the maneuverability of the vehicle. The vehicle has no differential so that traction is at all times present on all four tires 240. The tires 240 are of the pneumatic type and are inflated to a very low pressure, for example, only five pounds per square inch, giving several advantages, viz. a highly resilient support for the vehicle and a tire of sufficient resiliency to be easily distorted in rounding curves thus eliminating any need for a differential mechanism. The vehicle provides a means for carrying a load or burden in excess of the weight of the vehicle per se and as all of the wheels are drive wheels the vehicle is enabled to traverse rough terrain.

It is apparent that, within the scope of the invention, modifications and different arrangements may be made other than is herein disclosed, and the present disclosure is illustrative merely, the invention comprehending all variations thereof.

What I claim is:

1. A vehicle of the character disclosed in combination, a pair of spaced front and rear enclosures; a frame including a pair of laterally spaced tubular members rigidly connecting said enclosures; a body having a substantially uniplanar load supporting surface mounted upon said tubular members; pairs of road wheels arranged beneath said body and adjacent each of said enclosures for supporting the vehicle, at least one pair of road wheels being pivotally mounted for dirigible movement; an engine disposed beneath said body and rearwardly of said rear enclosure; power transmission mechanism contained within said enclosures for conveying power from said engine to each of said wheels; and a steering member arranged forwardly of said body connected to said dirigibly supported road wheels whereby steering movements may be effected.

2. A vehicle of the character disclosed, in combination; a pair of spaced housings; a pair of laterally spaced tubular frame members rigidly connecting said housings; a pair of road wheels arranged adjacent each of said housings; upwardly extending projections secured to said frame members; a load supporting body mounted upon said projections and having a flat load carrying upper surface; one pair of road wheels being dirigibly supported; and vehicle steering means including a manipulating handle arranged forwardly of said body and operatively connected to said dirigible road wheels for controlling the direction of movement of the vehicle.

3. A vehicle of the class described in combination, a frame structure; spaced driving mechanism enclosures forming a part of said frame structure; a pair of laterally spaced tubular members secured to and connecting said enclosures; pairs of driving wheels disposed adjacent the forward and rearward ends of said frame structure; a body supported directly upon said frame; an engine disposed beneath said body and rigidly supported upon one of said enclosures; each of said vehicle wheels being pivotally supported for dirigible movement; driving mechanism arranged in said enclosures and connected with said engine whereby positive drive connection to each drive wheel is effected without differential action; a steering member disposed forwardly of said body; and means associated with each of said wheels and connected with said steering member whereby steering is effected through all of the drive wheels.

4. A vehicle of the class described in combination, a frame structure including a pair of longitudinally extending laterally spaced tubular members; enclosures connected at each end of said tubular members; pairs of driving wheels disposed adjacent the forward and rearward ends of said frame structure; a body supported directly upon said frame; an engine disposed beneath said body and rigidly supported upon one of said enclosures; each of said vehicle wheels being pivotally supported rendering each of said vehicle wheels dirigible; and driving mechanism arranged in said enclosures and connected with said engine whereby positive drive connection to each drive wheel is effected without differential action.

5. In combination, a pair of spaced housings; means rigidly connecting said housings including a pair of laterally spaced tubular members; a pair of road wheels arranged adjacent each of said housings; power transmission mechanism disposed in each of said housings for transmitting power to said road wheels; said power transmitting mechanism including reduction gearing contained within said housings; means for dirigibly supporting each of said road wheels; an engine rigidly supported upon one of said housings; and means including a variable speed transmission mechanism disposed in the housing supporting said engine for connecting said engine to the power transmission mechanism contained within said housings.

6. A vehicle including undergear comprising a pair of mechanism enclosing housings; laterally spaced tubular frame members connected to said housings; a plurality of upwardly extending brackets secured to said frame members; a load supporting platform fixedly secured directly upon said brackets; an engine rigidly supported upon one of said housings; a pair of road wheels arranged adjacent each of said housings; one of said pairs of road wheels being dirigibly supported; power transmission gearing contained within said housings for transmitting power from said engine to said pairs of road wheels; means including a shaft establishing operative connection between the power transmission mechanisms contained in said housings; a disc carried by said shaft; brake mechanism operatively associated with said disc; a brake actuating lever pivotally supported upon said body; pawl and ratchet means for securing said lever in brake actuating position; a rod connected to said pawl; said rod and pawl mechanism being so arranged that depression of said rod moves the pawl toward brake setting position, and spring means for normally urging said pawl out of engagement with said ratchet.

7. In a vehicle of the character disclosed, a pair of spaced main housings; means including a pair of laterally spaced tubular members rigidly connecting said housings; a body structure supported directly upon said tubular members; an engine rigidly connected to one of said housings; supplemental housings associated with said main housings; drive shafts in said main housings; driven shafts in said supplemental housings; gearing connecting said drive shafts with said driven shaft; a wheel supporting member pivotally mounted upon each of said supplemental housings; road wheels journaled on said members; means including a universal joint connecting each of said driven shafts with said wheels; variable speed transmission gearing connecting said engine with the main shafts; the shafts and gearing in said main and supplemental housings for transmitting power to the drive wheels being such that driving is effected without differential action.

8. In a vehicle of the character disclosed, a pair of main housings; means including a pair of laterally spaced tubular members rigidly connecting said housings; a body structure supported upon said tubular members; an engine rigidly supported upon one of said housings and disposed beneath said body structure; supplemental housings associated with said main housings; drive shafts in said main housings; driven shafts in said supplemental housings; gearing connecting said drive shafts with said driven shafts; a wheel supporting member pivotally supported upon each of said supplemental housings; road wheels journaled on said members; means including a universal joint connecting each of said driven shafts to a road wheel; means for connecting said engine to said wheel driving shafts; the shafts and gearing in said main and supplemental housings for transmitting power to the drive wheels being such that driving is effected without differential action.

DELMAR G. ROOS.

REFERENCES CITED

The following references are of record in the file of this patent:

UNITED STATES PATENTS

| Number | Name | Date |
|---|---|---|
| 940,145 | Gray | Nov. 16, 1909 |
| 1,123,400 | Schwoob | Jan. 5, 1915 |
| 1,316,918 | Nogrady | Sept. 23, 1919 |
| 1,323,126 | Tolson | Nov. 25, 1919 |
| 1,340,759 | Duncan | May 18, 1920 |
| 1,349,249 | Alden | Aug. 10, 1920 |
| 1,391,699 | Schroeder | Sept. 27, 1921 |
| 1,512,562 | Radies | Oct. 21, 1924 |
| 1,919,925 | Blakeslee | July 25, 1933 |
| 1,978,974 | Williams | Oct. 30, 1934 |
| 2,026,283 | Madle | Dec. 31, 1935 |
| 2,107,073 | Herrington | Feb. 1, 1938 |
| 2,134,687 | Dunham | Nov. 1, 1938 |
| 2,172,177 | Rose | Sept. 5, 1939 |
| 2,219,601 | Quartullo | Oct. 29, 1940 |
| 2,252,861 | Porsche | Aug. 19, 1941 |
| 2,280,157 | Mead | Apr. 21, 1942 |
| 2,305,936 | Tjaarda | Dec. 22, 1942 |
| 2,334,980 | Allen | Nov. 23, 1943 |
| 2,349,388 | Sturges | May 23, 1944 |
| 2,356,164 | Keese | Aug. 22, 1944 |